United States Patent [19]
Jamison

[11] Patent Number: 5,214,248
[45] Date of Patent: May 25, 1993

[54] OPEN STAY FOR PLASTIC ENCLOSURE

[75] Inventor: David S. Jamison, Roanoke Rapids, N.C.

[73] Assignee: W.R. Grace & Co.-Conn., Duncan, S.C.

[21] Appl. No.: 782,947

[22] Filed: Oct. 25, 1991

[51] Int. Cl.⁵ .......................................... H02G 15/113
[52] U.S. Cl. ......................................... 174/92; 174/41
[58] Field of Search ................... 174/91, 92, 93, 41; 220/4.06, 4.07, 335

[56] References Cited

U.S. PATENT DOCUMENTS

| | | | |
|---|---|---|---|
| 3,701,835 | 10/1972 | Eisele et al. | 174/41 |
| 4,390,744 | 6/1983 | Suffi et al. | 174/41 |
| 4,536,611 | 8/1985 | Butler | 174/41 |
| 4,693,525 | 9/1987 | Shinoto | 220/335 |
| 4,704,499 | 11/1987 | Faust | 174/92 |
| 4,721,830 | 1/1988 | Dagan et al. | 174/41 |
| 4,805,979 | 2/1989 | Bossard et al. | 350/96 |
| 4,810,829 | 3/1989 | Rutenbeck et al. | 174/41 |
| 4,908,482 | 3/1990 | Shimirak et al. | 174/93 |
| 4,992,627 | 2/1991 | Mullaney | 174/41 |
| 5,036,997 | 8/1991 | May et al. | 220/335 |

Primary Examiner—Morris H. Nimmo
Attorney, Agent, or Firm—William D. Lee, Jr.; Mark B. Quatt; Leigh P. Gregory

[57] ABSTRACT

An enclosure suitable for enclosing aerial cable splices comprises an elongate generally cylindrical housing comprising a first, second, and third member, a first elongate hinge connecting the first and second members together, a second elongate hinge connecting the second and third members together, at least one female boss disposed on an outside surface of each of the first and third members, and at least one male boss disposed on an outside surface of the second member such that the first and third members can be releasably locked in an open position by means of the respective bosses.

7 Claims, 1 Drawing Sheet

OPEN STAY FOR PLASTIC ENCLOSURE

FIELD OF THE INVENTION

This invention relates to plastic enclosures, especially aerial splice covers, and more particularly to a means for allowing the plastic enclosure to stay in an open position.

BACKGROUND OF THE INVENTION

It is common practice to protect spliced sections of aerial cable and the like, using a protective enclosure.

Such enclosures are discussed for example in U.S. Pat. No. 4,721,830 (Dagan et al), U.S. Pat. No. 4,704,499 (Faust), and U.S. Pat. No. 4,810,829 (Rutenbeck et al).

Splicing cables is done up in the air at the cable height, and it is frequently difficult to perform this function while preparing to enclose the spliced cable in the protective enclosure.

It is therefore an object of the present invention to provide an improved cable enclosure which locks on itself after an angle of opening is achieved, in order to permit the completion of the splicing operation without interference from a cover of the enclosure.

This and other advantages of the invention will be set forth in the description which follows, or may be learned by practice of the invention.

SUMMARY OF THE INVENTION

In one embodiment of the present invention, an enclosure comprises an elongate generally cylindrical housing comprising a first, second, and third member; a first elongate hinge connecting the first and second members together; a second elongate hinge connecting the second and third members together; at least one female boss disposed on an outside surface of each of the first and third members; and at least one male boss disposed on an outside surface of the second member such that the first and third members can be releasably locked in an open position by means of the respective bosses.

BRIEF DESCRIPTION OF THE DRAWINGS

The invention may be further understood by reference to the sole drawing figure in which.

DESCRIPTION OF THE PREFERRED EMBODIMENTS

Figure 1:
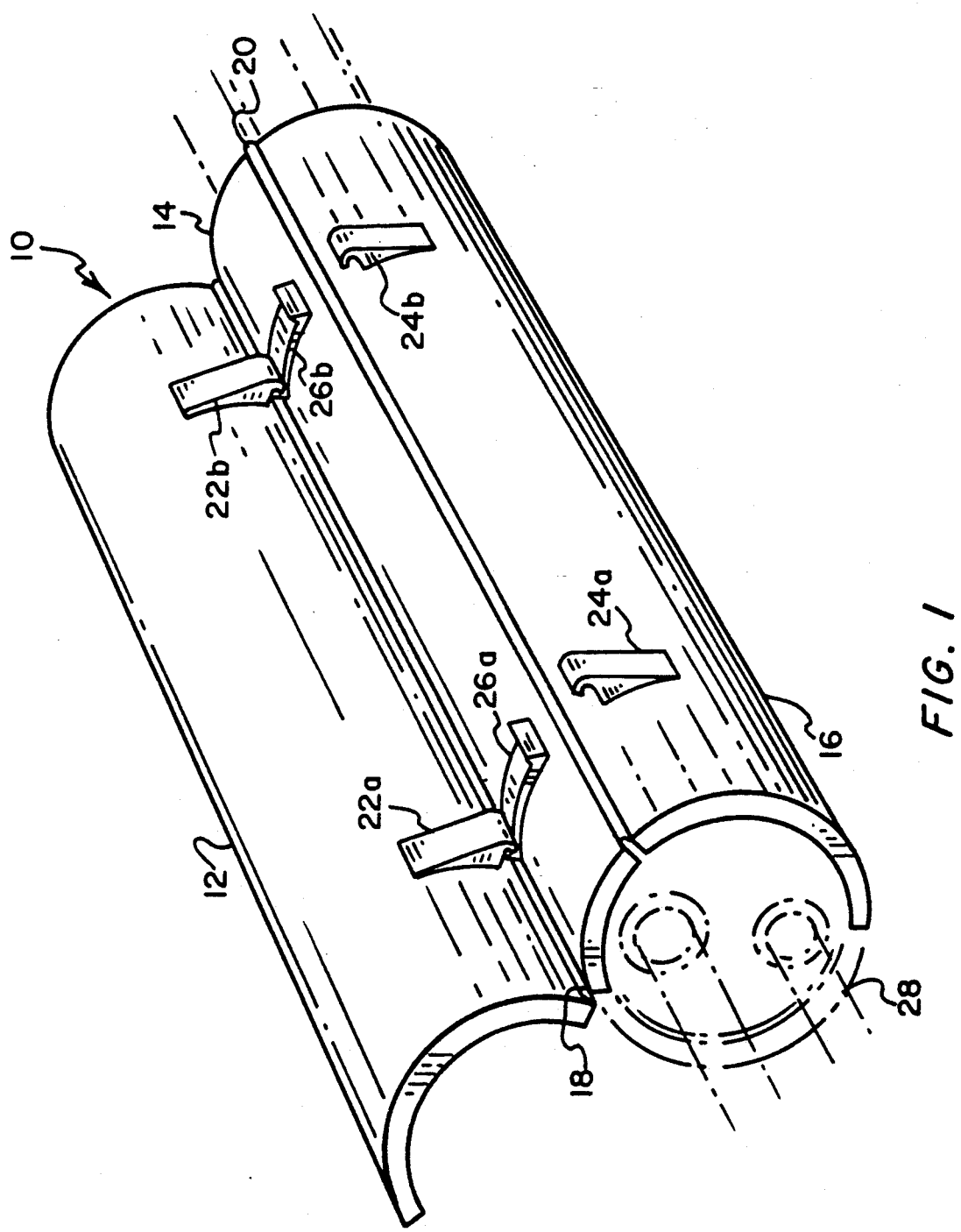
FIG. 1 is a perspective view of the enclosure showing a first member in an open, locked position and a third member in a closed, unlocked position.

Referring to FIG. 1, enclosure 10 of the present invention includes a first member 12, a second member 14, and a third member 16.

First member 12 and second member 14 are connected by a suitable hinge 18, which can be either an integral hinge, or a discrete hinge or a plurality of hinges which connect the first and second members together. Likewise, second member 14 and third member 16 are connected by a hinge 20 which, like hinge 18, can be either an integral hinge formed during for example a blow molded process, or else a discrete hinge which is later added to the second and third members to connect them together.

The first, second, and third members, with the appropriate hinge means, together form a generally cylindrical enclosure when in a closed position.

First member 12 includes at least one, and preferably two or more female bosses located on the outer surface of the member. As shown, first member 12 includes a pair of female bosses 22a and 22b. Likewise, third member 16 includes at least one, and preferably two or more female bosses. As shown, third member 16 includes a pair of female bosses 24a and 24b.

Second member 14, intermediate the first and third members, includes one more, and preferably two or more male bosses. As shown, second member 14 includes a pair of male bosses 26a and 26b.

As shown in the drawing, the first and/or the third member of the closure can be conveniently and releasably locked in an open position. This permits for example installation or maintenance personnel to work on the aerial cables 28 to be protected by the enclosure. Cables 28 are shown in phantom on FIG. 1, and do not form a part of the invention. Thus, by way of example, first member 12 is shown in a locked, open position in which the bosses on the first and second members respectively are engaged to hold the first member open, conveniently permitting access to the interior cavity formed by the first, second, and third members. Third member 16 is shown in a closed position, but can also be releasably locked into an open position by means of the bosses of second member 14 and third member 16 respectively.

The term "releasably" is used herein to mean that upon the application of reasonable manual force to the relevant members of the enclosure, the members can be returned to a closed position, e.g. after the work on the cable splice has been completed.

The enclosure of the present invention can beneficially include additional features such as a latching means for enclosing the enclosure after the splicing or other operation is performed; an attachment or hanging means for suspending the enclosure from an overhead support cable while an installation or maintenance operation is being performed; and appropriate sidewall members as needed or desired to enclose the ends of the enclosure from the environment and thereby protect the cable splice inside the enclosure. These features are all well known in the art.

The enclosure is preferably made of plastic materials, and more preferably blow-molded by means and methods well known in the art. Even more preferably, the enclosure is a blow-molded structure of double-wall construction.

The invention has been described with respect to preferred embodiments. Those skilled in the art will readily appreciate that modifications can be made to the invention as described without departing from the spirit and scope of the invention as claimed below.

What is claimed is:

1. An enclosure comprising:
   a) an elongate generally cylindrical housing comprising a first, second, and third member;
   b) a first elongate hinge connecting the first and second members together;
   c) a second elongate hinge connecting the second and third members together;
   d) at least one female boss disposed on an outside surface of each of the first and third members; and
   e) at least one male boss disposed on an outside surface of the second member such that the first and third members can be releasably locked in an open position by means of the respective bosses.

2. The enclosure of claim 1 wherein the enclosure is a plastic enclosure.

3. The enclosure of claim 1 wherein the enclosure is blow-molded.

4. The enclosure of claim 1 wherein the enclosure is a double-walled enclosure.

5. The enclosure of claim 1 wherein the hinges are integral hinges.

6. The enclosure of claim 1 further including side members disposed on each end of the enclosure.

7. An enclosure comprising:

a) an elongate generally cylindrical housing comprising a first and second member;
b) an elongate hinge connecting the first and second members together;
c) at lease one female boss disposed on an outside surface of the first member; and
d) at least one male boss disposed on an outside surface of the second member such that the first member can be releasably locked in an open position by means of the respective bosses.

* * * * *

UNITED STATES PATENT AND TRADEMARK OFFICE
CERTIFICATE OF CORRECTION

PATENT NO. : 5,214,248
DATED : May 25, 1993
INVENTOR(S) : Jamison

It is certified that error appears in the above-identified patent and that said Letters Patent is hereby corrected as shown below:

In Column 4, claim 7, line 5, change "lease" to read --least--.

Signed and Sealed this

Eleventh Day of January, 1994

Attest:

BRUCE LEHMAN

Attesting Officer

Commissioner of Patents and Trademarks